(12) United States Patent
Zhao et al.

(10) Patent No.: US 12,409,891 B2
(45) Date of Patent: Sep. 9, 2025

(54) COMPOSITE ENERGY ABSORBER FOR ELECTRIC VEHICLES

(71) Applicant: GM GLOBAL TECHNOLOGY OPERATIONS LLC, Detroit, MI (US)

(72) Inventors: Selina Xinyue Zhao, Rochester Hills, MI (US); Bradley Allen Newcomb, Troy, MI (US); Bhavesh Shah, Troy, MI (US); Erik Brandon Golm, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 318 days.

(21) Appl. No.: 17/986,421

(22) Filed: Nov. 14, 2022

(65) Prior Publication Data
US 2024/0158013 A1  May 16, 2024

(51) Int. Cl.
| | | |
|---|---|---|
| *B62D 21/15* | (2006.01) | |
| *B60R 19/02* | (2006.01) | |
| *B62D 24/00* | (2006.01) | |
| *B62D 25/02* | (2006.01) | |
| *B62D 29/04* | (2006.01) | |

(52) U.S. Cl.
CPC ............ *B62D 21/157* (2013.01); *B60R 19/02* (2013.01); *B62D 24/00* (2013.01); *B62D 25/025* (2013.01); *B62D 29/04* (2013.01); *B62D 29/043* (2013.01)

(58) Field of Classification Search
CPC .... B62D 25/025; B62D 21/157; B62D 29/04; B62D 29/041; B60Y 2306/01; B60R 2019/026; B60R 2019/186
USPC ............... 293/120; 296/209, 205, 187.12, 30
See application file for complete search history.

(56) References Cited

U.S. PATENT DOCUMENTS

| | | | |
|---|---|---|---|
| 8,608,232 B2 * | 12/2013 | Engertsberger | B62D 21/157 296/187.12 |
| 11,453,284 B2 * | 9/2022 | Aitharaju | H01M 50/24 |
| 2021/0156445 A1 | 5/2021 | Newcomb et al. | |

FOREIGN PATENT DOCUMENTS

| | | | | |
|---|---|---|---|---|
| DE | 102014012082 | * | 2/2016 | |
| JP | 2019206171 A | * | 12/2019 | B32B 1/02 |

OTHER PUBLICATIONS

JP2019206171 Text (Year: 2019).*
DE1020140112082 Text (Year: 2016).*

* cited by examiner

*Primary Examiner* — Dennis H Pedder

(57) ABSTRACT

An energy absorbing system includes a structural member and a composite energy absorber including a first member arranged within the structural member. The first member has a first repeating geometric pattern extending in a first direction along a first length, a first width in a second direction transverse to the first direction, and a first height in a third direction transverse to the first and second directions. The first member is made of a composite material including first reinforcing fibers and a first polymer matrix.

11 Claims, 8 Drawing Sheets

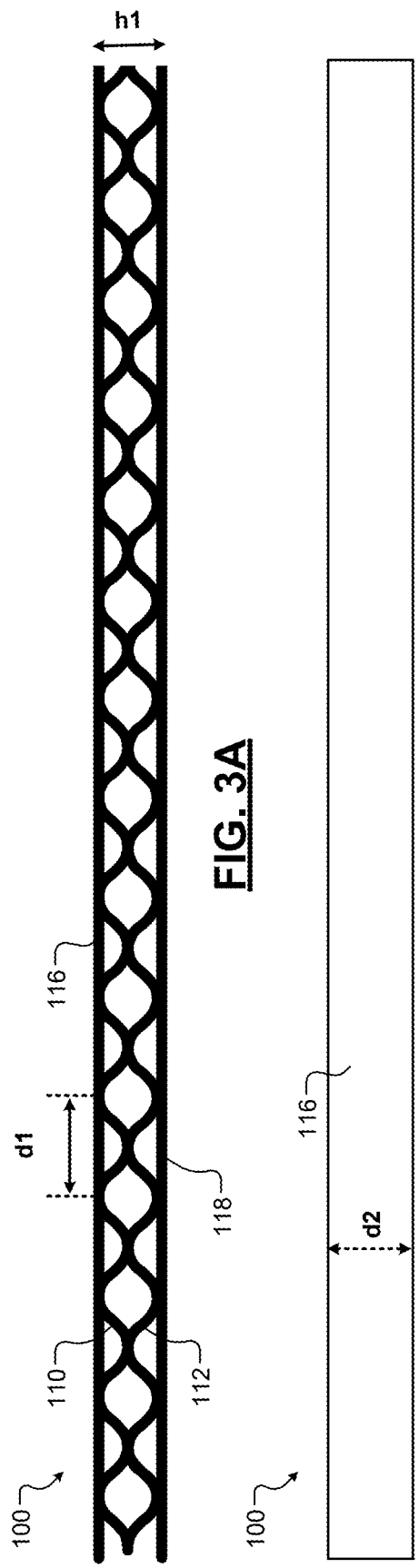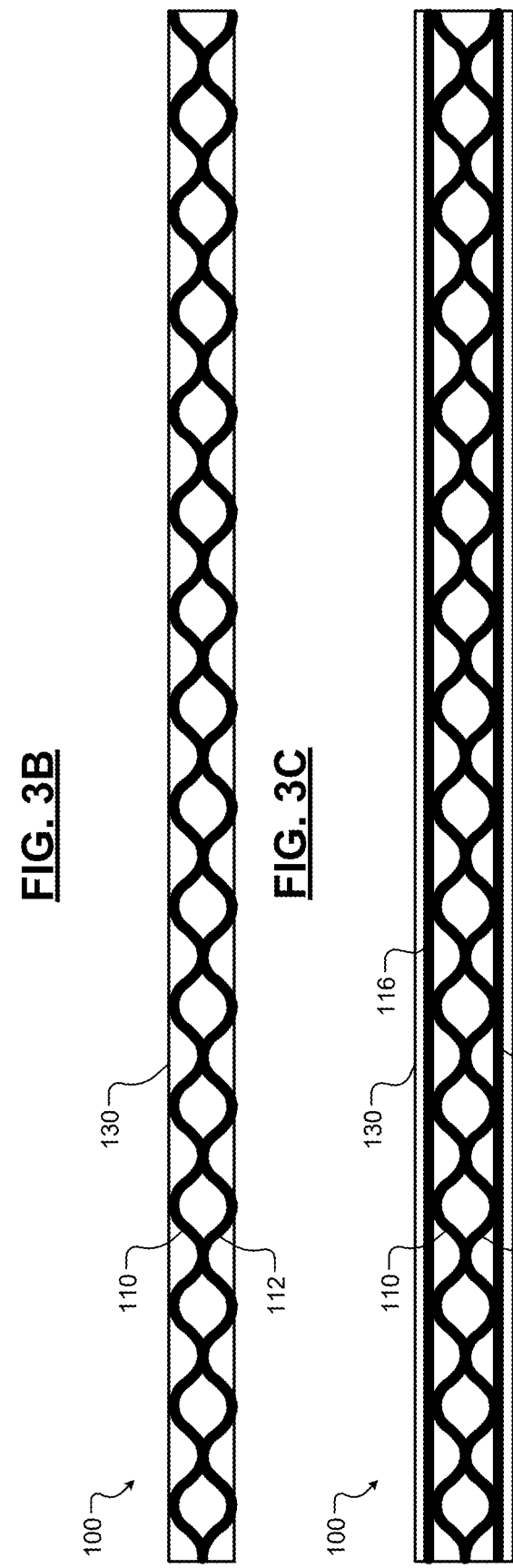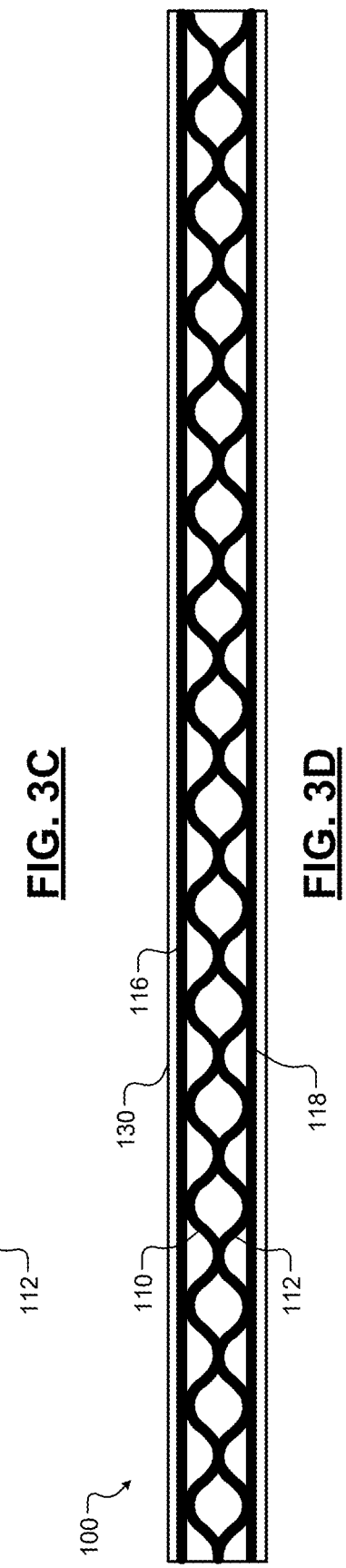

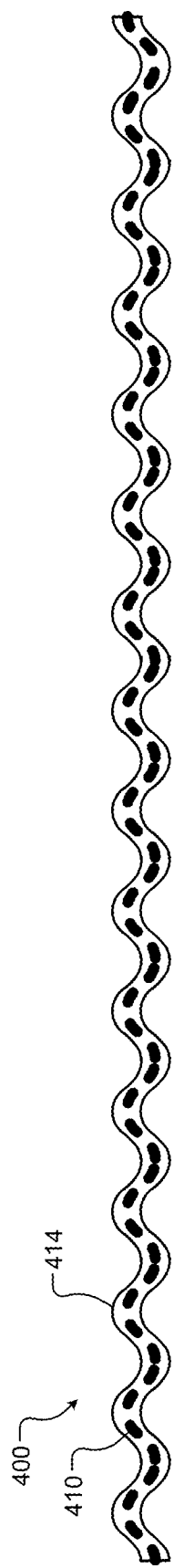
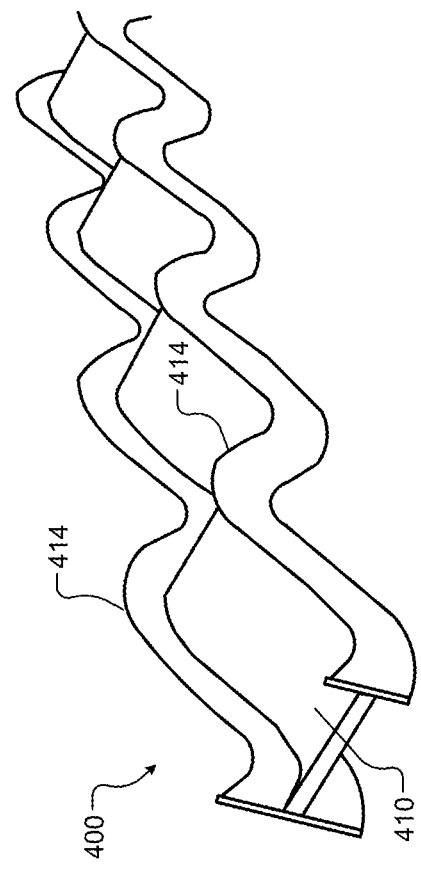
FIG. 6A
FIG. 6B

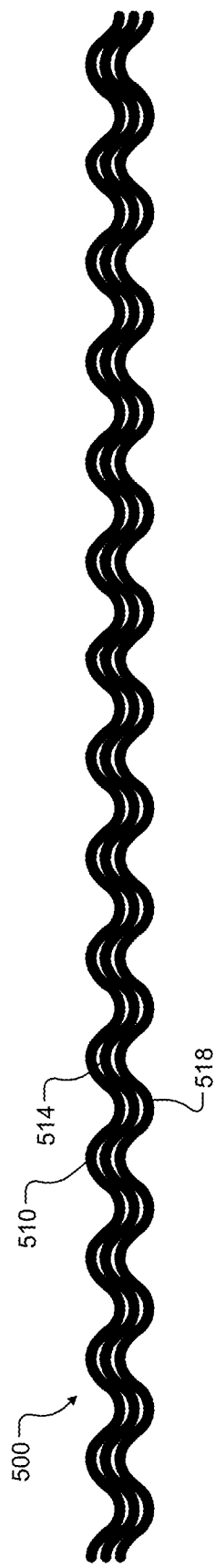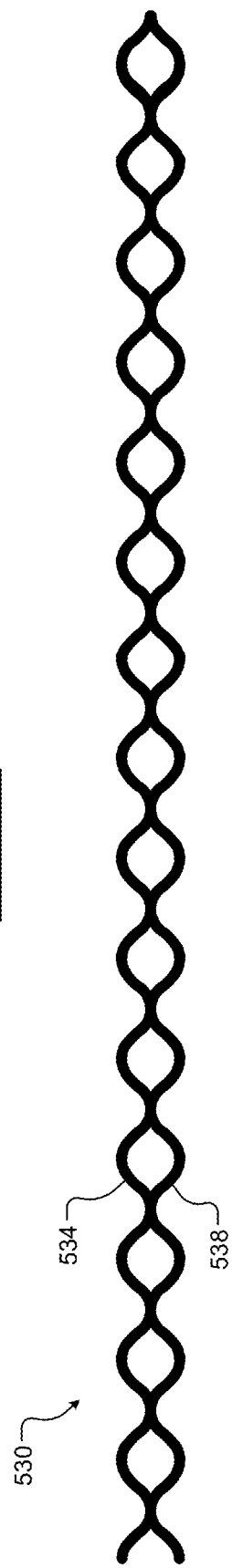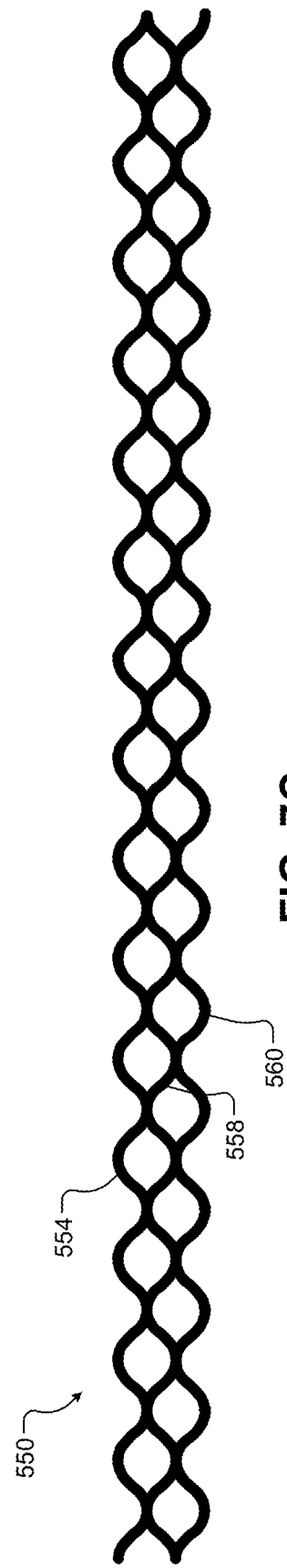
FIG. 7A
FIG. 7B
FIG. 7C

COMPOSITE ENERGY ABSORBER FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to energy absorbers, and more particularly to composite energy absorbers.

Electric vehicles (EVs) such as battery electric vehicles (BEVs), hybrid vehicles, and/or fuel cell vehicles include one or more electric machines and a rechargeable energy storage system (RESS). The RESS may include a battery system including one or more battery cells, modules and/or packs. A power control system is used to control charging and/or discharging of the battery system during charging and/or driving.

EVs and other non-EV vehicles are subjected to crash testing to ensure passenger safety. For example, the crash testing may include side impact tests. During a side impact test, a side pole impact structure is forced into a side of the vehicle. The vehicle typically includes a side rail with a rocker section and/or secondary energy absorbers designed to limit intrusion and absorb the side impact event.

SUMMARY

An energy absorbing system includes a structural member and a composite energy absorber including a first member arranged within the structural member. The first member has a first repeating geometric pattern extending in a first direction along a first length, a first width in a second direction transverse to the first direction, and a first height in a third direction transverse to the first and second directions. The first member is made of a composite material including first reinforcing fibers and a first polymer matrix.

In other features, a second member includes a second repeating geometric pattern in the first direction along the first length, has a second width in the second direction, and a second height in the third direction. The second member is made of a composite material including second reinforcing fibers and a second polymer matrix. Inner surfaces of the first member and the second member are connected together.

In other features, a first plate is connected to an outer surface of the first member. A second plate is connected to an outer surface of the second member. A sleeve encloses the first member and the second member. The first reinforcing fibers comprise carbon fibers. The first plate and the second plate comprise second reinforcing fibers in a second polymer matrix. The first repeating geometric pattern of the first member and the second repeating geometric pattern of the second member are sinusoidal shaped. The first repeating geometric pattern of the first member is elliptical shaped. The first repeating geometric pattern of the first member is polygonal shaped. The first repeating geometric pattern of the first member is fluted cone shaped.

In other features, a period of the first repeating geometric pattern is in a range from 50 to 500 mm. The first length is in a range from 0.5 m to 2.0 m. A thickness of the first member is in a range from 1 to 10 mm. The first width is in a range from 25 to 300 mm. Phases of the first member and the second member are aligned. Phases of the first member and the second member are out of phase. A periodicity of the first repeating geometric pattern of the first member varies along the first length.

In other features, the structural member comprises a rocker outer member and a rocker inner member. The composite energy absorber is arranged between the rocker outer member and the rocker inner member.

A composite energy absorber includes a first member including a first geometric pattern in a first direction along a first length, and having a width in a second direction transverse to the first direction and a height in a third direction transverse to the first and second directions. Second and third plates attached to a first side surface and a second side surface of the first member. The first member is made of a composite material including first reinforcing fibers in a first polymer matrix.

In other features, the first reinforcing fibers include fibers selected from a group consisting of carbon fibers, glass fibers, basalt fibers, and natural fibers. The first member is sinusoidal shaped. The first member is elliptical shaped. The first member is polygonal shaped.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A is a side view of an example of a composite energy absorber according to the present disclosure;

FIG. 3B is a plan view of the composite energy absorber of FIG. 3A;

FIG. 3C is a side view of the composite energy absorber of FIG. 3A arranged in a sleeve according to the present disclosure;

FIG. 3D is a side view of the composite energy absorber of FIG. 3A with an enclosing sleeve according to the present disclosure;

FIG. 6A is a side view of an example of a composite energy absorber according to the present disclosure;

FIG. 6B is a perspective view of the composite energy absorber of FIG. 6A;

FIG. 7A to 7C are side views of examples of composite energy absorbers according to the present disclosure;

In the drawings, reference numbers may be reused to identify similar and/or identical elements.

DETAILED DESCRIPTION

A composite energy absorber (EA) according to the present disclosure includes a geometric pattern that repeats in a lengthwise direction to increase crush efficiency of a rocker section or other structural member by reducing a peak load and intrusion distance during side impact events. In some examples, the composite energy absorber includes one or more outer plates and/or an outer sleeve to create uniform crush behavior for a vehicle body with uniform stiffness along the length of the rocker section and/or RESS rail. In some examples, the crush efficiency and stiffness of the composite energy absorber can be tailored depending upon the location in the rocker section and/or RESS rail of the vehicle.

In some examples, the composite energy absorber is inserted in a primary energy absorber (e.g., such a rocker section) and/or in a secondary energy absorber (e.g., such as a RESS rail). The composite energy absorber includes a fiber reinforced composite material with an energy absorbing structure (e.g., such as a repeating sinusoidal, elliptical, polygon or other geometric pattern) having a corrugated structure. In some examples, the repeating geometric pattern includes a fluted cone shape with a taper.

In some examples, the geometry has a periodicity that is fixed or variable in a lengthwise direction. In some examples, the geometric pattern such as a sinusoidal pattern varies in a plane perpendicular to the impact direction (e.g., vertical). In some examples, the periodicity of the geometric pattern is in a range between 50 mm and 500 mm and an amplitude is in a range between 5 mm and 200 mm. In some examples, the amplitude is in a range between 5 mm and 50 mm In some examples, outer plates are arranged in one or more locations to connect one or more sinusoidal crests. In some examples, the outer plates have a minimum bonding wall height in a range from 10-25 mm (e.g., 10 mm).

In some examples, the composite energy absorber is arranged in a sleeve. In some examples, the sleeve is either a pultruded composite or an extruded, polymeric, non-fiber reinforced material that surrounds some or all of the composite energy absorber. Still other features will be described below.

Figure 1:
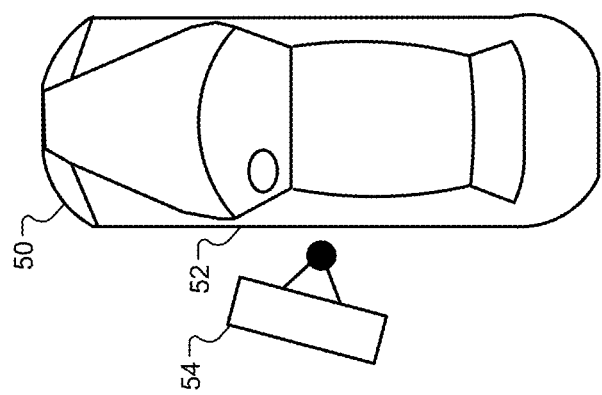
FIG. 1 is a plan view of a vehicle during a side impact test.

Referring now to FIG. 1, a vehicle 50 includes sides 52. During a side pole impact test, an impact structure 54 is forced against one of the sides 52 of the vehicle 50 to simulate a side impact event. In some examples, the impact structure 54 impacts the vehicle 50 at an angle such as 15% relative to a direction perpendicular to a direction of travel.

Figure 2:
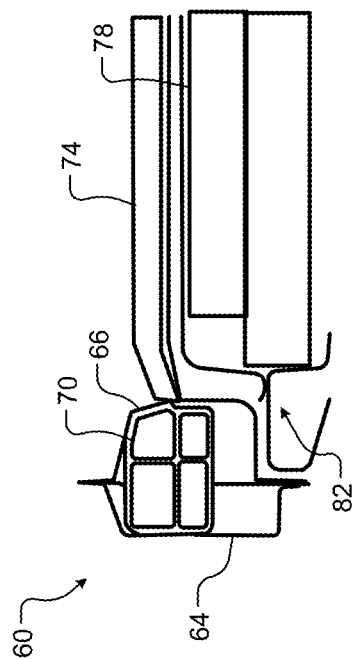
FIG. 2 is a side cross-sectional view of a rocker section of a vehicle.

Referring now to FIG. 2, a rocker section 60 of a vehicle includes a rocker outer member 64, a rocker inner member 66, and an internal energy absorber 70. The rocker section 60 acts as a primary energy absorber during the side impact events. In addition to the rocker section 60, a secondary energy absorber (e.g., a RESS rail 82) may also be used to prevent intrusion into a RESS assembly 78 of an EV. The vehicle further includes body and/or floor members 74 arranged above the RESS assembly 78.

More particularly, a minimum intrusion distance may be specified for both the rocker section 60 and the RESS rail 82 to protect the RESS assembly 78 of the EV. The secondary energy absorber (the RESS rail 82) preferably meets force and intrusion requirements with minimum mass.

The total energy absorbed by the rocker section 60 and the RESS rail 82 is based upon material selection and design. Most of the energy is absorbed by the rocker outer member 64, the rocker inner member 66, and the internal energy absorber 70. Since it is desired to minimize the reaction force and intrusion distance to the battery by the RESS rail 82, it is also possible to utilize space in the RESS rail 82 with minimum design changes to the rest of the RESS structure.

A composite energy absorber (EA) according to the present disclosure is integrated into rocker section, a RESS rail and/or other structural member to increase crush efficiency by reducing a peak load and intrusion distance during the side impact events. The stiffness and level of energy absorption of the composite energy absorber is tailored so that maximum energy absorption occurs by crushing the entire length of the composite energy absorber with less stiffness (that could potentially cause localized high reaction force to the battery within the side structures). The composite energy absorber is designed such that the local force to initiate failure and absorb the impact energy is lower than the force required to initiate local crush/buckling failure for the side structures and their reinforcements including shear plates.

Referring now to FIGS. 3A to 3C, a composite energy absorber 100 according to the present disclosure is shown. In FIG. 3A, the composite energy absorber 100 includes a first sinusoidal shaped member 110 and a second sinusoidal shaped member 112 extending lengthwise. In this example, the first and second sinusoidal shaped members 110 and 112 are out of phase and are formed or attached together. In this example, the amplitude of the first and second sinusoidal shaped members 110 and 112 vary in a vertical direction when installed (or in a direction transverse to an anticipated impact direction) to provide maximum impact strength, although other orientations can be used. A first plate 116 and a second plate 118 are arranged on outer surfaces of the first and second sinusoidal shaped members 110 and 112.

In FIG. 3A, a periodicity of the first and second sinusoidal shaped members 110 and 112 is fixed and is equal to a distance d1. In some examples, d1 is in a range from 50 to 500 mm. In some examples, d1 is in a range from 80 to 120 mm (e.g., 106 mm). In some examples, a thickness of the composite is in a range from 1 to 4 mm (e.g., 2.5 mm).

In FIG. 3B, a width of the first and second sinusoidal shaped members 110 and 112 and/or the first plate 116 and the second plate 118 transverse to the direction that the sinusoidal pattern extends is equal to d2. In some examples, a width of the first and second sinusoidal shaped members 110 and 112 is in a range from 25 to 300 mm (e.g., 106 mm). In some examples, a width of the first and second sinusoidal shaped members 110 and 112 is in a range from 25 to 150 mm (e.g., 106 mm).

In some examples, a height or amplitude of each of the first and second sinusoidal shaped members 110 and 112 is in a range from 5 to 50 mm (e.g., 25 mm). In some examples, a height of the composite energy absorber 100 is in a range from 10 to 120 mm (e.g., 68 mm).

In FIGS. 3C-3D, a sleeve 130 may be used instead of and/or in addition to the first plate 116 and/or the second plate 118 to enclose the members 110 and 112. In some examples, a length of the composite energy absorber is in a range from 0.4 to 2.5 m (e.g., 1.8 m).

In some examples, the first and second plates 116, 118 are made of carbon or glass fibers arranged in a polymer matrix. Walls of the first and second sinusoidal shaped members 110 and 112 comprise carbon and/or glass fibers arranged in a polymer matrix. In some examples, the composite energy absorbing 100 is manufactured as a single component (e.g., the length of the rocker). In other examples, two or more shorter sections are fabricated and individually assembled into the vehicle (e.g., 2×0.9 m, 4×0.45 m). In some examples, different reinforcing fibers are used in different locations in order to meet variable structural requirements and/or corrosion/joining needs. While a constant periodicity is shown, variable periodicity can be used along the length of the composite energy absorber.

Figure 4A:
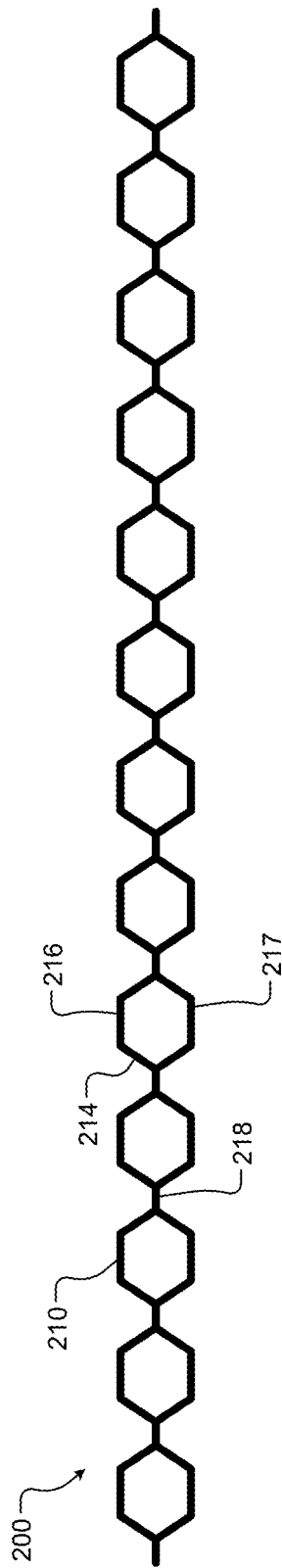
FIG. 4A is a side view of an example of a composite energy absorber according to the present disclosure.
Figure 4B:
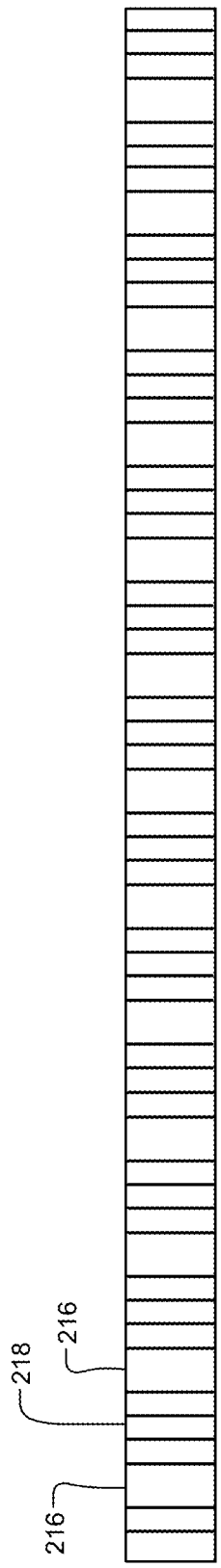
FIG. 4B is a plan view of the composite energy absorber of FIG. 4A.
Figure 4C:
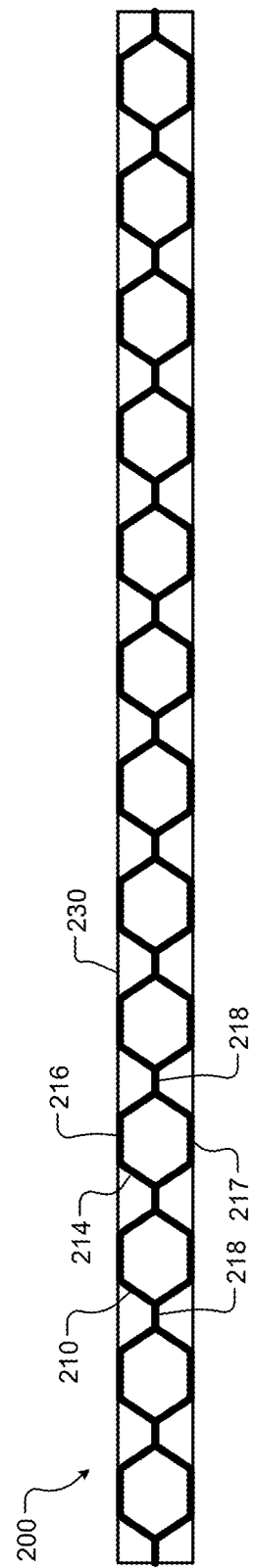
FIG. 4C is a side view of the composite energy absorber of FIG. 4A arranged in a sleeve according to the present disclosure.

Referring now to FIGS. 4A to 4C, a composite energy absorber 200 according to the present disclosure is shown. In FIGS. 4A and 4B, the composite energy absorber 200 includes repeating polygonal shaped members 210 (e.g., a hexagon or other polygonal shape). The polygonal shaped members 210 include first and second surfaces 216, 217 and sloped sides 214. Connecting members 218 are parallel to the first and second surfaces 216, 217 of the polygonal shaped member 210 arranged therebetween. In FIG. 4C, the composite energy absorber 200 may be arranged in a sleeve 230. Alternately, top, bottom and side plates may be used.

In some examples, the composite energy absorber is manufactured using thermoplastic or thermoset resin systems. The manufacturing processes include pultrusion, injection molding, compression molding, and/or resin transfer molding processes. In some examples, the reinforcing fibers for the thermoset resin system process are selected from a group consisting of carbon fiber, glass fiber, basalt fiber, and/or natural fibers. In some examples, the reinforcing fibers for the thermoplastic resin system process are selected from a group consisting of carbon fiber, glass fiber, basalt fiber, natural fibers, and/or short fibers. In some examples, compression molding is used to form the first member and the second member and then the first member and the second member are joined.

Figure 5A:
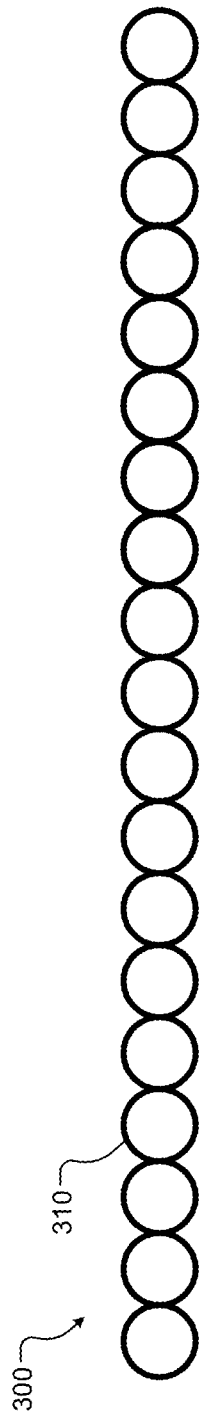
FIG. 5A is a side view of an example of a composite energy absorber according to the present disclosure.
Figure 5B:
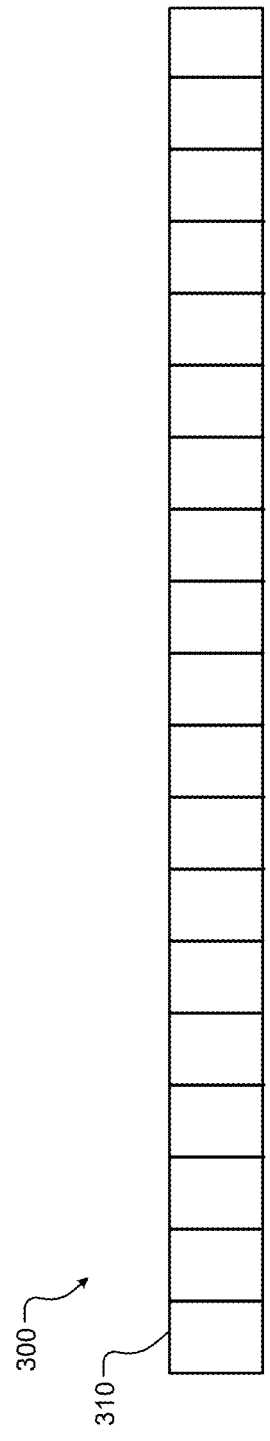
FIG. 5B is a plan view of the composite energy absorber of FIG. 5A.
Figure 5C:
FIG. 5C is a side view of the composite energy absorber of FIG. 5A arranged in a sleeve according to the present disclosure.

Referring now to FIGS. 5A to 5C, a composite energy absorber 300 according to the present disclosure is shown. In FIGS. 5A and 5B, the composite energy absorber 300 includes repeating elliptical or circular shaped members 310. In FIG. 5C, the composite energy absorber 300 may be arranged in a sleeve 320. Alternately, top, bottom, or side plates may be used.

In some examples, the elliptical or circular shaped members are formed as individual cylinders or tubes that are assembled into a continuous array. The cylinders or tubes are formed separately and arranged on a backing plate. The cylinders or tubes may be locked into place with an expandable foam. The cylinders or tubes are vibration welded (thermoplastic) and/or adhesively bonded (thermoset or thermoplastic) onto the backing plate. The backing plate can be made of polymer, fiber reinforced composite, or other materials.

Referring now to FIGS. 6A to 6B, a composite energy absorber 400 includes a first member 410 and supporting face plates 414 arranged on opposite side surfaces thereof. The first member 410 may have a repeating geometric pattern such as a sinusoidal, polygonal, elliptical or other pattern. The composite energy absorber 400 may be arranged in a sleeve. In some examples, the face plates 414 have sinusoidal upper and lower edges. In other examples, the face plates 414 are rectangular.

The face plates 414 can be molded directly with the sinusoidal shape during a compression or injection molding process. In some examples, the face plates 414 are added when pultrusion is used. In some examples, the face plates 414 are joined to sides of the sinusoidal shaped member 410 by vibration welding (thermoplastic matrix), adhesive bonding (thermoset or thermoplastic matrix), and/or a physical joint (e.g., an L-bracket with a fastener such as a screw, bolt, rivet, etc.).

Referring now to FIGS. 7A to 7C, a composite energy absorber according to the present disclosure can include two or more sinusoidal shaped members. In FIG. 7A, a composite energy absorber 500 includes three sinusoidal shaped members 510, 514 and 518. The sinusoidal shaped members 510, 514 and 518 have aligned phases. The sinusoidal shaped members 510, 514 and 518 can be arranged in a sleeve and/or include top, bottom, and/or side plates.

In FIG. 7B, a composite energy absorber 530 includes sinusoidal shaped members 534 and 538. The sinusoidal shaped members 534 and 538 are 180° out of phase. The sinusoidal shaped members 534 and 538 can be arranged in a sleeve or include top, bottom, and/or side plates.

In FIG. 7C, a composite energy absorber 550 includes three sinusoidal shaped members 554, 558 and 560. A middle one of the sinusoidal shaped members (e.g., 558) is 180° out of phase relative to sinusoidal shaped members 554 and 560. The sinusoidal shaped members 554, 558 and 560 can be arranged in a sleeve or include top and bottom plates as described above.

As can be appreciated, two or more layers of the sinusoidal member can be used. The multiple layers can be stacked and phase aligned to minimize packaging space as shown in FIG. 7A. The multiple layers can be stacked and shifted to create closed sections as shown in FIG. 7B. The multiple layers can be stacked and shifted with variable phases as shown in FIG. 7C.

Figure 8A:
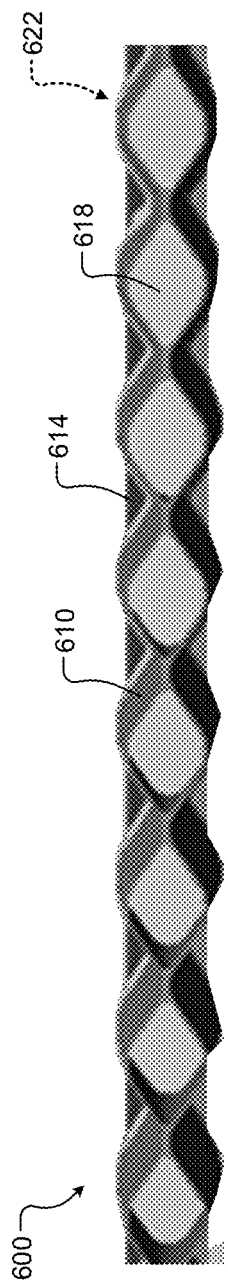
FIG. 8A is a side view of an example of a composite energy absorber.
Figure 8B:
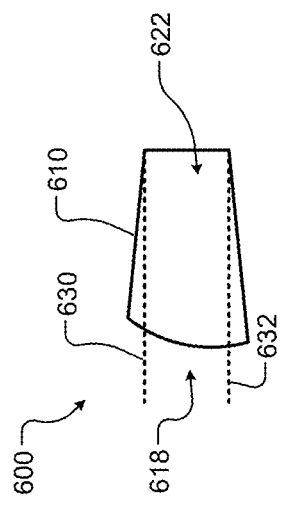
FIG. 8B is a side cross-sectional view of the composite energy absorber of FIG. 8A according to the present disclosure.

Referring now to FIGS. 8A and 8B, a composite energy absorber 600 according to the present disclosure is shown. In FIG. 8A, the composite energy absorber 600 includes a repeating fluted cone shaped member 610. An opening on one side 618 of the fluted cone shaped member 610 is larger than an opening on opposite side 622. A wall support 614 may be attached on one or both sides.

In FIG. 8B, the fluted cone shaped member 610 is shown in more detail. Sides of the fluted cone shaped member 610 are sloped relative to a horizontal direction in FIG. 8B.

In some examples, the tapered or fluted cone shaped members 610 are arranged such that an opening is horizontal. The tapering or fluting serves as a draft angle when injection molding is used. In some examples, the draft angle is in a range from 3° to 10° (e.g., 5°).

In an optimized system, the fluted cone shaped members 610 do not need to have the same width, wall thickness, length, and/or periodicity. This is due to vehicles not having the same stiffness cross-car along its length. Thickness can also vary along the length of a wall. For example, thinner regions can be arranged at the rocker outer and thicker regions can be arranged at the rocker inner. In some examples, the composite energy absorber 600 can be compression molded as a two-piece structure and joined in a secondary step.

Figure 9A:
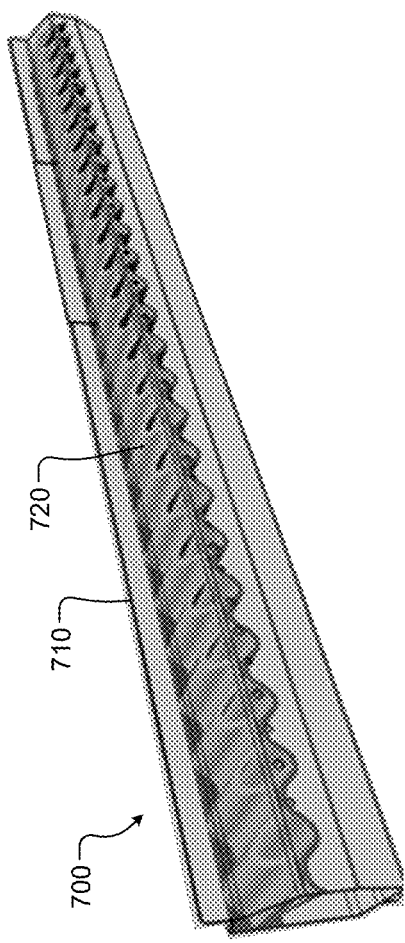
FIG. 9A is a perspective view of an example of a composite energy absorber arranged in a rocker section according to the present disclosure.
Figure 9B:
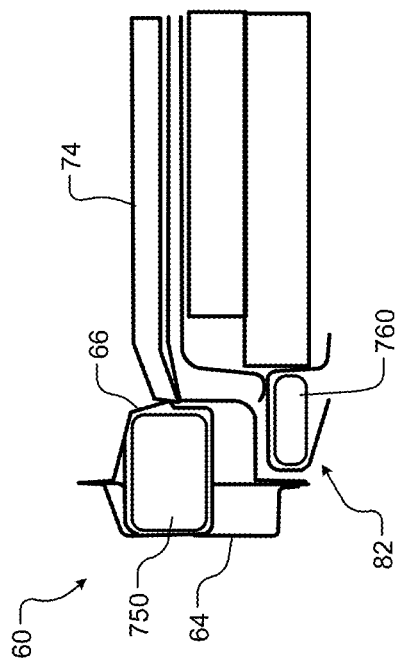
FIG. 9B is a side cross-sectional view of another example of a rocker section and secondary absorber including composite energy absorbers according to the present disclosure.

Referring now to FIG. 9A, a rocker section 700 includes structural surfaces 710 and a composite energy absorber (CEA) 720 arranged in the rocker section 700. In FIG. 9B, the rocker section 60 includes a composite energy absorber 750. A secondary energy absorber such as a RESS rail 82 includes a composite energy absorber 760.

The composite energy absorbers according to the present disclosure reduce the mass of the rocker section and peak loads (e.g., in some cases more than 50% as compared to prior rocker sections without the composite energy absorbers). As a result, more energy can be absorbed using rocker sections or other structural members integrating composite energy absorbers as described herein.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. An energy absorbing system comprising:
a structural member; and
a composite energy absorber arranged within the structural member, the composite energy absorber including a first member, a separate second member attached to the first member, first and second plates, at least one of the first and second plates attached to an outer surface of the first member, and a sleeve enclosing the first member and the second member,
wherein the first member has a first repeating geometric pattern extending in a first direction along a first length, a first width in a second direction transverse to the first direction, and a first height in a third direction transverse to the first and second directions,
wherein the second member has a second repeating geometric pattern in the first direction along the first length, and
wherein the first member is made of a composite material including first reinforcing fibers and a first polymer matrix.

2. The energy absorbing system of claim 1, wherein:
the second member has a second width in the second direction, and a second height in the third direction,
the second member is made of a composite material including second reinforcing fibers and a second polymer matrix, and
wherein inner surfaces of the first member and the second member are connected together.

3. The energy absorbing system of claim 2, wherein:
the first plate is attached to the outer surface of the first member; and
the second plate is attached to an outer surface of the second member.

4. The energy absorbing system of claim 3, wherein the first plate and the second plate comprise second reinforcing fibers in a second polymer matrix.

5. The energy absorbing system of claim 2, wherein the first repeating geometric pattern of the first member and the second repeating geometric pattern of the second member are sinusoidal shaped.

6. The energy absorbing system of claim 1, wherein:
a period of the first repeating geometric pattern is in a range from 50 to 500 mm;
the first length is in a range from 0.5 m to 2.0 m;
a thickness of the first member is in a range from 1 to 4 mm; and
the first width is in a range from 25 to 300 mm.

7. The energy absorbing system of claim 2, wherein the first member and the second member are in phase.

8. The energy absorbing system of claim 2, wherein the first member and the second member are out of phase.

9. The energy absorbing system of claim 1, wherein a periodicity of the first repeating geometric pattern of the first member is fixed along the first length.

10. The energy absorbing system of claim 1, wherein:
the structural member comprises a rocker outer member and a rocker inner member, and
the composite energy absorber is arranged between the rocker outer member and the rocker inner member.

11. The energy absorbing system of claim 1, wherein the first and second plates are sinusoidal shaped.

* * * * *